Figure 1:
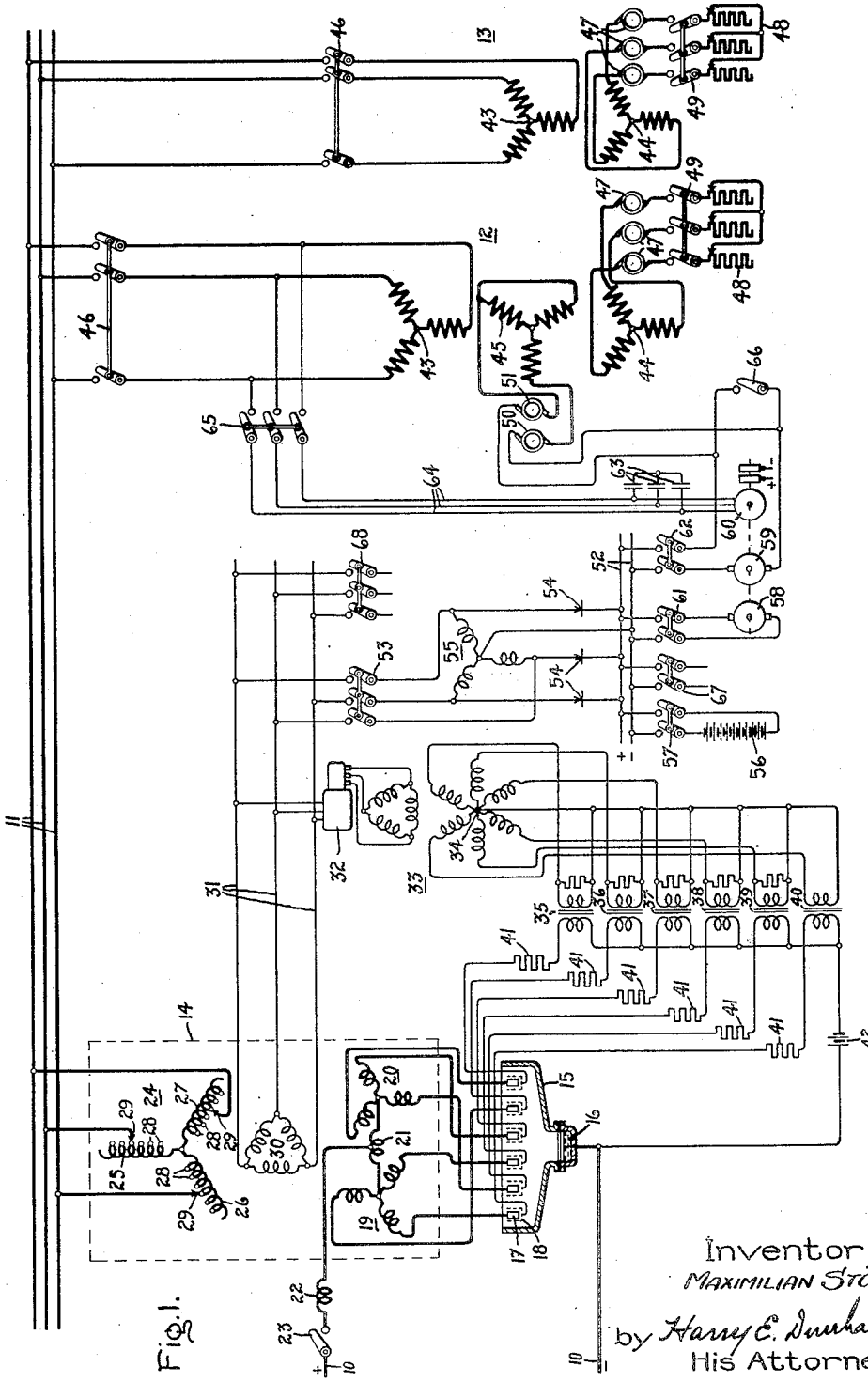

Patented Aug. 4, 1942

2,292,171

UNITED STATES PATENT OFFICE 2,292,171

ELECTRIC VALVE OPERATED MOTOR

Maximilian Stöhr, Berlin-Hermsdorf, Germany, assignor to General Electric Company, a corporation of New York Application August 20, 1940, Serial No. 353,427
In Germany August 11, 1939

8 Claims. (Cl. 172—274)

My invention relates to electric valve operated motors and more particularly to an improved circuit arrangement for providing the auxiliary electric power necessary for starting and operating an electric motor energized from a direct current source through a valve converting system.

In my copending application Serial No. 234,817, filed October 13, 1938, and assigned to the same assignee as the present invention, now Patent 2,254,714, dated September 2, 1941, I have shown a motor of the type adapted for driving a locomotive and energized from an electric valve converting system from a direct current source. The motor includes an auxiliary rotor which is brought up to speed by an independent source of power before the valve converting system is placed in operation. This auxiliary rotor is maintained in operating condition at all times when the locomotive is on the road or stopped for brief intervals and supplies the counterelectromotive force required for commutating the current from one to another of the electric valves of the valve converting system. The present invention is particularly adapted for use in connection with a system of the type disclosed in my above identified application and relates to an improved arrangement for obtaining the necessary energy required for bringing the auxiliary rotor up to speed and for maintaining this winding energized while the valve converting system is in operation. Since the system is particularly adapted for use on vehicles such as locomotives it is desirable to provide a system which is reliable in operation and which consumes as little space as possible. It is also desirable to provide a valve converting system for energizing an electric driving motor in which it is not necessary to make any electrical connections external of the locomotive or other vehicle for starting the system other than the usual trolley connection with the high voltage direct current system.

It is therefore an object of my invention to provide an improved power supply system for supplying the electric power required for starting an electric motor energized from a high voltage direct current source through a valve converting system.

It is another object of my invention to provide an improved power supply system for a traction motor energized from a direct current source through a valve converting system and having an auxiliary rotor which is brought up to speed independently of the operation of the valve converting system to provide a source of commutating potential.

It is another object of my invention to provide an improved valve converting system for energizing the driving motors of a locomotive which may be started and operated with no electrical connections external of the locomotive in addition to the trolley connection with a high voltage direct current system.

In accordance with an illustrated embodiment of my invention I provide an electric valve operated motor energized from a direct current source through an electric valve converting system including a transformer having one winding provided with tap changing equipment. The motor is provided with an intermediate rotor which is brought up to a predetermined speed by exciting the stator winding of the motor from a source of three-phase potential before the valve converting system is brought into operation. After the intermediate rotor is up to speed the intermediate rotor winding is excited from a source of direct current having a component which may vary in accordance with the load on the motor to give the motor the desired speed load characteristics. The transformer is provided with a third winding or with connections to taps of one of the high voltage windings to provide a source of low voltage alternating current potential which may be used to supply the auxiliary equipment necessary for starting the intermediate rotor and for energizing this winding when the system is in operation. The auxiliary equipment includes a low voltage direct current circuit which may be energized from a battery when the valve converting system is not in operation and which in turn is utilized to energize a motor generator set for supplying the alternating current potential necessary for bringing the intermediate rotor up to a predetermined speed. The direct current motor also drives a direct current generator in one embodiment of my invention which supplies the load dependent component of the excitation of the intermediate rotor. When the valve converting system is in operation energy is supplied to the low voltage direct current circuit so that the battery is only called upon when it is desired to start the intermediate rotor of the machine. The speed of the main driving rotor is controlled by variable resistors connected between the slip rings thereof as well as by tap changing equipment on the main transformer.

My invention will be better understood by reference to the following description taken in connection with the accompanying drawings and its scope will be pointed out in the appended claims.

Figure 2:
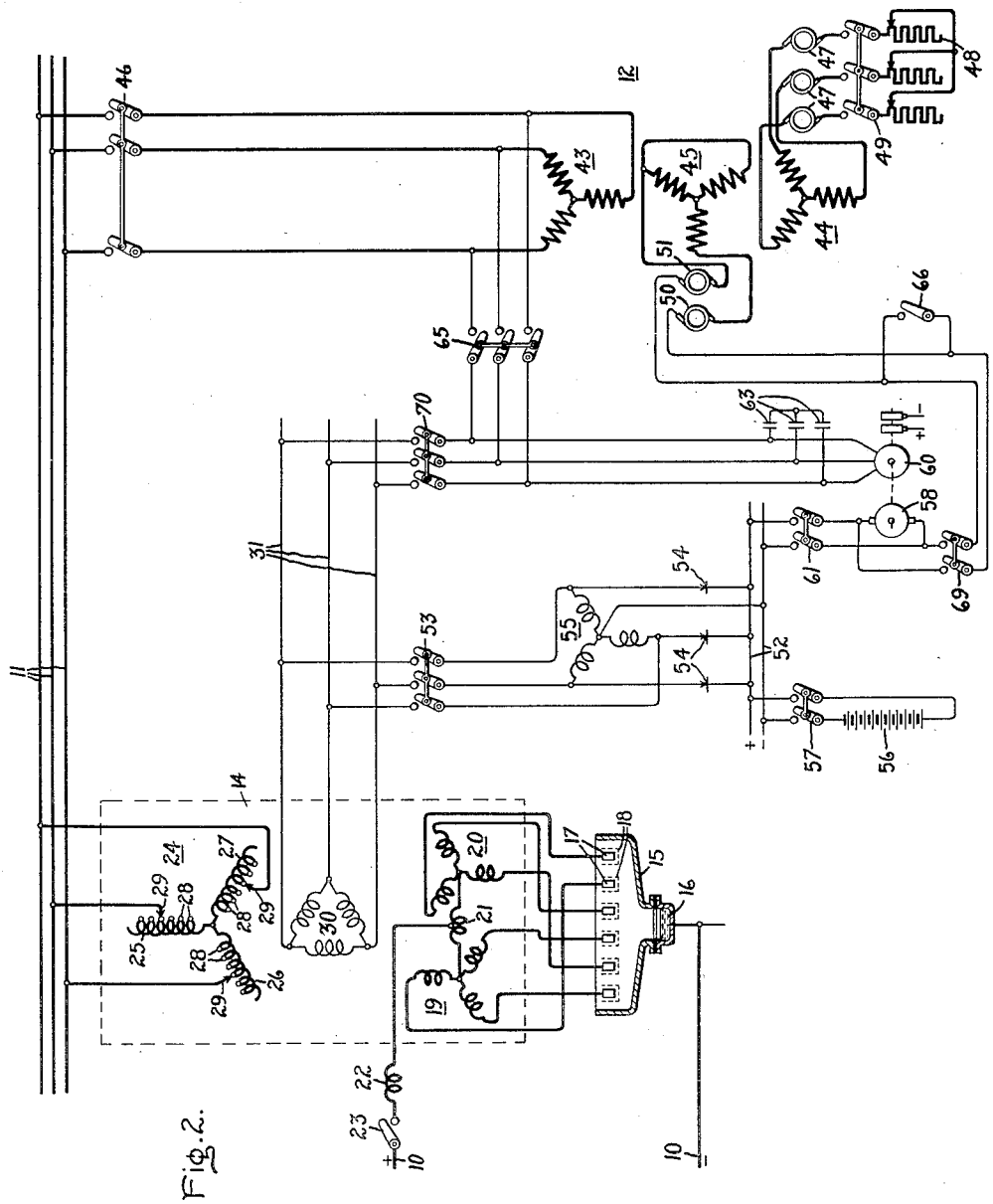

In the drawings Fig. 1 is a schematic representation of one embodiment of my invention, and Fig. 2 is a schematic representation of a modification.

Referring now to Fig. 1 of the drawings, I have illustrated my invention in connection with an electric valve converting apparatus for transmitting energy from a high voltage direct current source 10 to a three-phase alternating current bus 11 from which the traction motors 12 and 13 are energized. The valve converting apparatus includes a transformer 14 and an electric discharge device 15 which, as illustrated, is of the type having a single pool type cathode 16, a plurality of anodes 17 and a plurality of control members or grids 18, all of which are mounted within an envelope containing an ionizable medium. It will be apparent to those skilled in the art that any other type of electric discharge device having a plurality of discharge paths may be provided. The transformer 14 includes Y-connected windings 19 and 20 having the end terminals thereof connected with the anodes 17 of the electric valve means 15, and having the neutral terminals thereof interconnected by an interphase transformer 21, the midpoint of which is connected through a smoothing reactor 22 and a main circuit breaker 23 to one of the direct current lines 10. The other of the direct current lines is connected with the cathode 16. The transformer 14 also includes a Y-connected winding 24 having the phase windings 25, 26 and 27 thereof each provided with taps 28 which are selectively connected with the alternating current bus 11 through suitable tap changing conductors 29 shown schematically and designated by the numeral 29. The transformer 14 also includes a winding 30 which, as illustrated may be a three-phase delta connected winding from which the three-phase conductors 31 are energized. The control members or grids 18 of the electric valve means 15 are energized from the alternating current circuit 31 through a phase shifter 32 and a main excitation transformer 33 having a six-phase secondary winding 34. The electrically displaced voltages of the six-phases of the secondary windings 34 are impressed on control members 18 by the individual transformers 35 to 40 inclusive. The secondary windings of these transformers each have one terminal connected to one of the control members 18 through a current limiting resistor 41 and the other terminals connected together and to the cathode of the space discharge device 15 through a biasing battery 42. The particular excitation circuit just described forms no part of the present invention and it is apparent that other suitable excitation circuits may be used.

The traction motor 12 is of the type disclosed in my above identified copending application and includes a stator winding 43, a main rotor winding 44 and an auxiliary rotor winding 45. The terminals of the Y-connected stator winding 43 are connected to the alternating current bus 11 through switching means 46. The end terminals of Y-connected rotor winding 44 are connected to the slip rings 47 which are connected through suitable brushes to a three-phase variable resistor 48 through switching means 49. One of the phase windings of intermediate rotor 45 is connected to a slip ring 50, while the end terminals of the two remaining phases are connected to slip ring 51. The motor 13 is the same as the motor 12 with the exception that no intermediate rotor is provided and corresponding parts have been designated by the same numerals.

As described in my above mentioned copending application, it is necessary to bring the intermediate rotor 45 up to predetermined speed to provide a commutating potential for the electric valve converting system so that it will operate to transmit energy from the direct current circuit 10 to the winding 43 of the motor. This may be accomplished by short circuiting the terminals of the winding 45 and exciting the stator winding 43 from a source of three-phase alternating current potential. Having brought the rotor winding 45 up to a certain speed the three-phase potential may be removed from the winding 43 and direct current excitation applied to the winding 45. At this time the winding 45 will induce a commutating potential in the winding 43 and upon closure of switches 46 and 23 the converting system is placed in operation. It is apparent that upon closure of switch 46 the control members 18 of the electric discharge device 15 are energized by alternating current potentials impressed thereon through winding 30 of the main transformer, phase shifter 32, excitation transformer 33 and the individual transformers 35 to 40. The periodic potentials applied to the members 18 sequentially overcome the effect of the biasing battery 42 to render the discharge paths conductive in a predetermined sequence. After rotor 45 has been brought up to a predetermined speed and the converter placed in operation, the driving rotor 44 of the motor 12 may be started by closing the switch 49 and gradually reducing the resistance connected between the slip rings 47. Thus far in the operation the tap changing conductors 29 are on the lowest voltage taps of the transformer winding 24. The speed of the rotor 44 may be further controlled by increasing the voltage applied to the alternating current bus 11 and to the stator winding 43. This increased voltage increases the speed of the rotor 43 which in turn determines the frequency of the commutating potentials and of the excitation of the control electrodes 18.

According to the present invention, improved arrangements are provided for obtaining the potential necessary for starting the auxiliary rotor and furnishing the excitation necessary after it has been started. Referring again to Fig. 1, a low voltage direct current circuit 52 may be energized from the three-phase alternating current bus 31 when the valve converting system is in operation through circuit breaker 53 and unilaterally conducting devices 54 which may be contact rectifiers or electric discharge valves if desired. The rectifier elements 54 are illustrated as connected to the end terminals of a polyphase inductive winding 55 having its neutral terminal connected to one side of the direct current circuit 52. Low voltage direct current bus 52 is also arranged to be energized from a battery 56 through switch 57 when the electric valve converting system is not in operation. A direct current motor 58, a direct current generator 59, and an alternating current generator 60 have their rotary elements mounted on a common shaft. The armature winding of the direct current motor 58 is connected to be energized from the direct current bus 52 through a switch 61. Direct current generator 59 has its armature winding connected in series with the direct current bus 52 and the slip rings 50 and 51 of the intermediate rotor 45 through a switch 62. When switch 62 is closed the voltage generated by generator 60 is added to that of the bus 52 to excite the winding 45. As will be pointed out in a later part of this specification the field excitation of the direct current generator, which for the sake of simplicity has not been shown, may be controlled to give the motor 12 any desired characteristics. The alternating current generator 60 may be excited from the direct current bus 52 or it may be self-excited through the capacitors 63 which are Y connected across the three-phase output conductors 64 of the alternating current generator 60. The conductors 64 are arranged to be connected with the terminals of the stator winding 43 of motor 12 through switch 65. A short circuiting switch 66 for the intermediate rotor 45 is provided so that the rotor may be short circuited while it is brought up to speed in the same manner as the rotor of an induction motor. When the valve converting system is in operation the battery 56 may be kept charged from the winding 30 through the rectifier elements 54. The bus 52 also provides a source of potential for operating all the auxiliary equipment which may be operated from a constant potential direct current source. This power may be taken off through the switch 67. The alternating current bus 31 provides a source of variable frequency alternating current of substantially constant potential for supplying any load which may be provided with variable frequency alternating current. This load may be taken off through switch 68.

The features and advantages of the present invention will be better understood by a consideration of the operation of the system just described. Assuming, for example, that the system is installed on a locomotive and that the rotor on which winding 44 is wound is geared directly to one of the axles, the system may be put in operation by first starting the intermediate rotor 45 in the same manner as the short circuited rotor of an induction motor. To do this, it is necessary to close the switch 66 to short circuit the rotor windings and to close switch 57 to energize the direct current bus 52 from the battery 56 and to close switch 61 to start the direct current motor 58. With these switches closed the alternating current generator 60 will be rotated by the direct current motor and by closing switch 65 a three-phase alternating current potential is applied to the stator winding 43 of the motor 12. When the rotor 45 comes up to speed determined by the frequency of the alternating current generator 60, switch 66 is opened and switch 62 closed to energize the intermediate rotor from bus 52 through the armature winding of the direct current generator 59. The intermediate rotor now runs as a synchronous motor inducing an electromotive force in the winding 43. The valve converting system may now be brought into operation by closing switches 23 and 46. Upon closure of switch 46 it is apparent that the alternating current potential induced in the winding 43 will be impressed on the main grid transformer 33 through the phase shifter 32 and the auxiliary winding 30 of the main transformer 14. The control members or grids 18 which are biased negatively by the battery 42 are now periodically rendered positive by the alternating potential and the discharge paths of the electric valve means 15 are periodically rendered conductive. During this time the rotor 44 which for example may be geared to the driving axle of a locomotive, has been open circuited and the tap changing equipment has been on a low voltage tap. With the valve converting system in operation, if it is desired to drive the locomotive the switch 49 may be closed and the variable resistances 48 gradually removed until the locomotive reaches a certain speed. Further speed control of the rotor 44 may be accomplished by increasing the voltage of the alternating current bus 11 by means of the tap changing equipment which will result in increased speed of auxiliary rotor 45. By controlling the excitation of the winding 45 in accordance with the load current transmitted by the electric valve converting system it is possible to give the motor 12 series or compound motor characteristics. This may be done easily with the arrangement shown in Fig. 1 since the constant component of excitation is provided by the direct current circuit 52 and the voltage of the generator 59 is added thereto. If the excitation of the direct current generator 59 is made dependent upon the load the excitation of winding 45 is controlled in the desired manner.

In Fig. 2 there is shown a modification of my invention which in many respects is the same as that shown in Fig. 1 and the same numerals have been used to designate like parts. The grid control has been omitted from the arrangement shown in Fig. 2 for purposes of simplicity, but it is understood that an excitation circuit of the type shown in Fig. 1 may be used. In Fig. 2 the direct current generator 59 has been omitted and the direct current motor 58 and alternating current generator 60 are arranged so that they may operate either as a motor or a generator. The direct current motor 58 is arranged to be connected with the direct current circuit 52 through a switch 61 as in the modification illustrated in Fig. 1. The armature of this machine is also arranged to be connected with the slip rings 50 and 51 through a switch 69. The alternating current machine 60 is arranged to have the armature terminals thereof connected to the terminals of the rotor winding 43 through a switch 65 in the same manner as in the arrangement described in Fig. 1, and is also arranged to be connected to the alternating current bus 31 through a switching means 70.

With this arrangement, the intermediate rotor 45 is brought up to speed in the same manner as that described in connection with Fig. 1. The switch 57 is closed to energize the direct current circuit 52 from the battery 56 and switch 61 is closed to energize the direct current machine 58 from the direct current circuit 52. When the switch 61 is closed the alternating current machine 60 is operated as a generator and when switch 65 is closed supplies three-phase alternating current to the winding 43. When it is desired to supply direct current to the rotor winding 45 which was short circuited during the period which machine 60 was supplying alternating current to the winding 43, it is only necessary to open the switches 61, 65 and 66, and to close the switches 69 and 70. With the switches in the latter positions the alternating current machine 60 operates as an alternating current motor and the direct current machine 58 operates as a direct current generator to supply the excitation of winding 45. It is to be understood that the frequency of the alternating current circuit 31 varies during the operation of the motor 12 so that the speed of the alternating current machine 60 also varies. However, the excitation of the direct current machine 58 may be controlled in accordance with the operating conditions of the valve converting system and the electric motor so that the desired load speed characteristic of the motor 12 is obtained.

While I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dynamo-electric machine provided with a stator winding and a rotor winding, a source of direct current, means for energizing one of said windings from said source comprising a plurality of electric discharge paths and a transformer associated therewith, means comprising a second rotor winding in said dynamo-electric machine for producing an electro-magnetic field linking the winding energized by said means to induce therein a counter-electromotive force, means for controlling the conductivities of said electric discharge paths and cooperating with said counter-electromotive force to commutate current from one of said discharge paths to another, and means including an auxiliary winding on said transformer for supplying a direct current potential for energizing said second rotor winding during operation of said electric discharge paths.

2. In combination, a dynamo-electric machine provided with a stator winding and a rotor winding, a source of high voltage direct current, electric translating apparatus for energizing one of said windings from said source including a plurality of electric discharge paths and a transformer associated therewith, a second rotor winding in said dynamo-electric machine for producing an electro-magnetic field linking the winding energized by said electric translating apparatus to induce therein a counter-electromotive force, means for controlling the conductivities of said electric discharge paths and cooperating with the counter-electromotive force produced by said second rotor to commutate the current from one of said discharge paths to another, and means including a plurality of unilaterally conductive devices and a winding of said transformer for supplying a direct current potential for energizing said second rotor winding during operation of said electric translating apparatus.

3. In combination, a dynamo-electric machine including a stator winding and a rotor winding, a supply circuit, electric translating apparatus connecting said supply circuit and one of the windings of said machine for transmitting energy therebetween including a plurality of electric discharge paths and a transformer associated therewith, means comprising a second rotor winding for producing a counter-electromotive force and impressing it on the circuit of said electric discharge paths, means for controlling the conductivities of said electric discharge paths and cooperating with said counter-electromotive force to commutate the current from one of said electric discharge paths to another, and means including a winding of said transformer for supplying a direct current potential for energizing said second rotor winding during operation of said electric translating apparatus.

4. In combination, a dynamo-electric machine provided with a stator winding and a rotor winding, a source of direct current, electric translating apparatus inter-connecting said source and one of the windings of said dynamo-electric machine including a plurality of electric discharge paths and a transformer associated therewith, a second rotor in said dynamo-electric machine for inducing a counter-electromotive force in the winding of said machine with which said electric translating apparatus is connected, means comprising said second rotor for commutating current from one of said electric discharge paths to another, a low voltage direct current circuit, means including a plurality of unilaterally conducting devices and a portion of said transformer for energizing said low voltage direct current circuit when said translating apparatus is in operation, a motor generator set including a motor energized from said direct current circuit and a generator for producing a variable direct current potential, the output of said generator and said direct current circuit being connected in series to supply a variable excitation potential to said second rotor winding.

5. In combination, a dynamo-electric machine provided with a stator winding and a rotor winding, a source of high voltage direct current, electric translating apparatus interconnecting said source and one of the windings of said dynamo-electric machine including a plurality of electric discharge paths and a transformer associated therewith, a low voltage direct current circuit, means comprising a second rotor winding for introducing a counter-electromotive force into the circuit of said stator winding and control means cooperating therewith to commutate the current from one discharge path to another, means including a winding of said transformer for supplying direct current to said low voltage circuit when said electric translating apparatus is in operation, means for supplying direct current potential from said low voltage circuit to said second rotor winding, and additional means for supplying direct current potential of variable magnitude to said second rotor winding to control the speed-load characteristics of said dynamo-electric machine.

6. In combination, a dynamo-electric machine provided with a stator winding and a rotor winding, a source of direct current, electric translating apparatus inter-connecting said source and one of the windings of said dynamo-electric machine including a plurality of electric discharge paths and a transformer associated therewith, means comprising a second rotor for introducing a counter-electromotive force in circuit with said electric discharge paths, control means cooperating therewith for commutating the current from one discharge path to another, a low voltage direct current system including a source of direct current potential, means for converting said low voltage direct current potential into alternating current potential and impressing it on the stator winding of said dynamo-electric machine when said translating apparatus is not in operation to rotate said second rotor, means for supplying direct current potential to said second rotor when said translating apparatus is in operation, and means for supplying energy to said low voltage direct current system from said transformer when said translating apparatus is in operation.

7. In combination, a direct current source, a dynamo-electric machine including a stator winding and a rotor winding, electric translating apparatus interconnecting said source and one of said windings including electric valve means and a transformer associated therewith, a second rotor winding in said dynamo-electric machine for producing an electromagnetic field linking said one of said windings, a low voltage direct current circuit, a supply of direct current potential for energizing said circuit, means energized by said low voltage direct current circuit for supplying alternating current potential to the stator winding of said machine when said electric translating apparatus is not in operation to bring said second rotor winding up to a predetermined speed to induce in said one of said windings a commutating potential for said electric valve means, control means cooperating with the counter-electromotive force to commutate the current between said electric valve means, means connecting said low voltage direct current circuit to said intermediate rotor winding to supply direct current excitation to said winding when said electric valve means is in operation, and means including a portion of said transformer for supplying energy to said low voltage direct current circuit when said translating apparatus is in operation.

8. In combination, a dynamo-electric machine provided with a stator winding and a rotor winding, a direct current supply circuit, electric translating apparatus interconnecting said supply circuit and one of the windings of said dynamo-electric machine including a plurality of electric discharge paths and a transformer associated therewith, means comprising a second rotor winding for introducing a counter-electromotive force in circuit with said electric discharge paths, and control means cooperating therewith to commutate current from one electric discharge path to another, a low voltage direct current circuit, means including a portion of said transformer for deriving an alternating current voltage of constant magnitude and variable frequency, auxiliary direct current and alternating current dynamo-electric machines having rotatable elements mechanically coupled, means connecting said auxiliary direct current dynamo-electric machine to said low voltage direct current circuit to energize said direct current machine as a motor and operate said auxiliary alternating current machine as a generator, means connecting said alternating current generator to the stator winding of said dynamo-electric machine to cause said second rotor to rotate at a predetermined speed when said translating apparatus is not in operation, switching means for connecting said auxiliary direct current machine to said second rotor and additional switching means connecting said auxiliary alternating current machine to said auxiliary alternating current circuit to operate it as a driving motor for said auxiliary direct current machine to provide direct current excitation potential for said second rotor during operation of said electric translating apparatus.

MAX STÖHR.